United States Patent
Aabye et al.

(10) Patent No.: US 9,898,729 B2
(45) Date of Patent: *Feb. 20, 2018

(54) MUTUAL MOBILE AUTHENTICATION USING A KEY MANAGEMENT CENTER

(71) Applicant: VISA INTERNATIONAL SERVICE ASSOCIATION, San Francisco, CA (US)

(72) Inventors: Christian Aabye, Foster City, CA (US); Sasikumar Kannappan, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 14/656,430

(22) Filed: Mar. 12, 2015

(65) Prior Publication Data

US 2015/0186868 A1 Jul. 2, 2015

Related U.S. Application Data

(63) Continuation of application No. 14/062,709, filed on Oct. 24, 2013, now Pat. No. 9,009,478, which is a (Continued)

(51) Int. Cl.
*H04L 29/06* (2006.01)
*G06Q 20/32* (2012.01)
(Continued)

(52) U.S. Cl.
CPC ....... *G06Q 20/3227* (2013.01); *G06F 21/445* (2013.01); *G06Q 20/28* (2013.01);
(Continued)

(58) Field of Classification Search
CPC ....... H04L 9/08; H04L 9/0802; H04L 9/0805; H04L 9/0838
See application file for complete search history.

(56) References Cited

U.S. PATENT DOCUMENTS

| | | | |
|---|---|---|---|
| 5,805,702 A * | 9/1998 | Curry | G06Q 20/06 705/66 |
| 6,327,578 B1 | 12/2001 | Linehan | |
| 7,389,531 B2 | 6/2008 | Fransdonk | |
| 2009/0119504 A1* | 5/2009 | van Os | H04L 9/3271 713/153 |
| 2010/0211507 A1 | 8/2010 | Aabye et al. | |

FOREIGN PATENT DOCUMENTS

CN 101449509 A 6/2009
KR 10-2005-0103681 A 11/2005
(Continued)

OTHER PUBLICATIONS

Chinese Office Action dated Aug. 28, 2014 for CN Patent Application No. 201180013970.X, with English translation, 28 pages.
(Continued)

*Primary Examiner* — Edward Zee
(74) *Attorney, Agent, or Firm* — Kilpatrick Townsend Stockton LLP

(57) ABSTRACT

A system, method, and server computer configured to authenticate a consumer device. The consumer device is authenticated via a mobile gateway using challenge-response authentication. If the consumer device is successfully authenticated, a secure channel is established between the consumer device and a first entity. The secure channel allows for secure communication between the consumer device and the first entity.

17 Claims, 8 Drawing Sheets

Related U.S. Application Data continuation of application No. 13/075,592, filed on Mar. 30, 2011, now Pat. No. 8,601,266.

(60) Provisional application No. 61/319,698, filed on Mar. 31, 2010.

(51) Int. Cl.
| | | |
|---|---|---|
| *G06F 21/44* | (2013.01) | |
| *H04L 9/08* | (2006.01) | |
| *H04L 9/32* | (2006.01) | |
| *G06Q 20/28* | (2012.01) | |
| *G06Q 20/38* | (2012.01) | |

(52) U.S. Cl.
CPC ..... *G06Q 20/3226* (2013.01); *G06Q 20/3829* (2013.01); *H04L 9/083* (2013.01); *H04L 9/321* (2013.01); *H04L 9/3271* (2013.01); *H04L 63/06* (2013.01); *H04L 63/08* (2013.01); *H04L 2209/80* (2013.01)

(56) References Cited

FOREIGN PATENT DOCUMENTS

| WO | 2007/118178 A2 | 10/2007 |
| WO | 2011/123671 A2 | 10/2011 |

OTHER PUBLICATIONS

Sankar, K., et al., "Cisco Wireless LAN Security," Cisco Press, 2004, ISBN 1-58705-154-0, pp. 157-192.

Menezes, A., et al., :Handbook of Applied Cryptography, CRC Press, 1996, pp. 36-37, 546-547 and figs 1.16 and 13.1.

PCT Search Report and Written Opinion for Application No. PCT/US2011/030766, dated Nov. 8, 2011, 11 pages.

Russian Office Action dated Sep. 9, 2015 for RU Patent Application No. 2012139270/08, with English translation, 11 pages.

\* cited by examiner

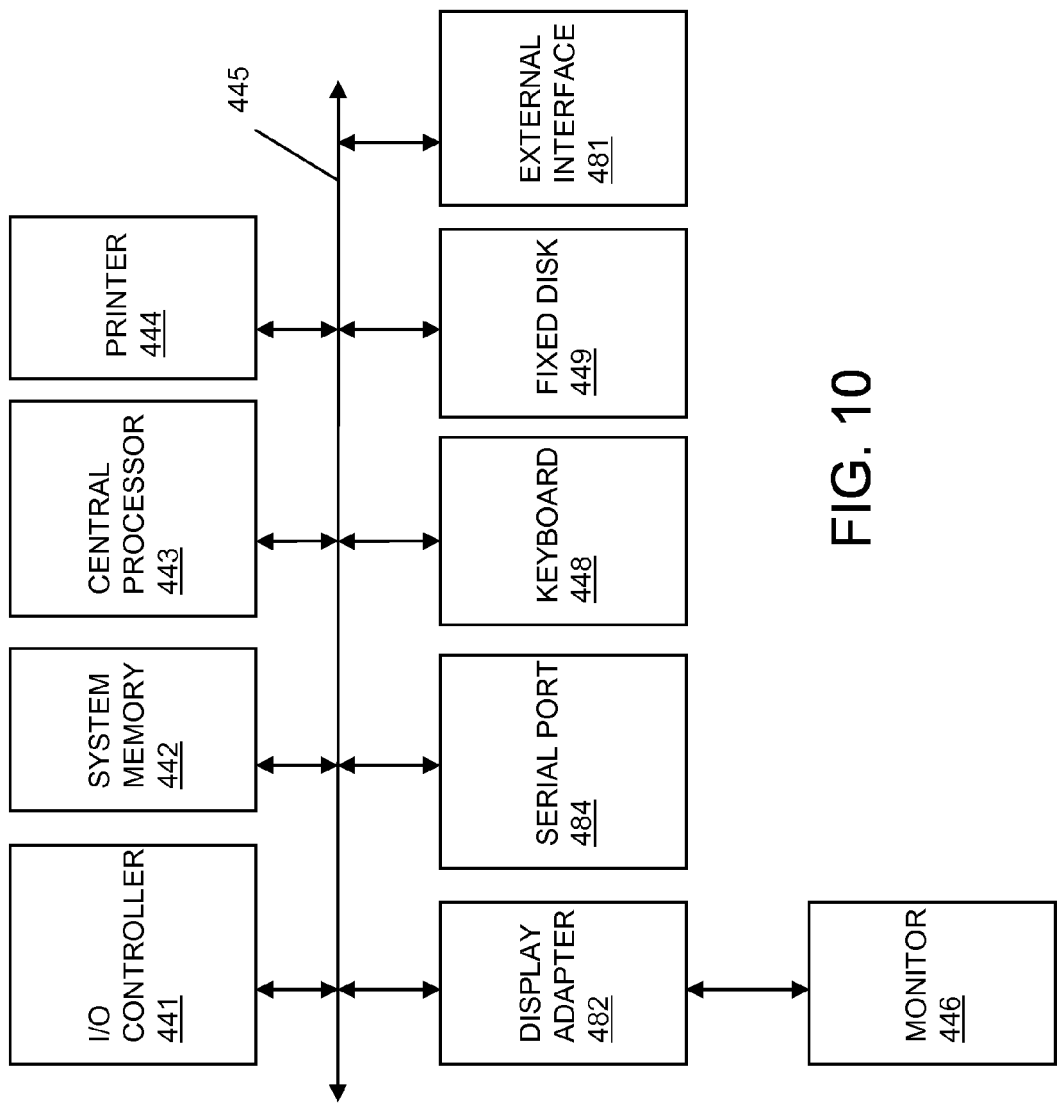

MUTUAL MOBILE AUTHENTICATION USING A KEY MANAGEMENT CENTER

CROSS-REFERENCES TO RELATED APPLICATIONS

The present application is a continuation application of U.S. patent application Ser. No. 14/062,709, filed on Oct. 24, 2013, which is a continuation of U.S. patent application Ser. No. 13/075,592, filed on Mar. 30, 2011, which issued as U.S. Pat. No. 8,601,266, which is a non-provisional application of and claims priority to U.S. Provisional Application No. 61/319,698, filed on Mar. 31, 2010, the contents of which are all hereby incorporated by reference in their entirety for all purposes.

BACKGROUND

The use of mobile devices has rapidly increased in recent years. For example, mobile device users now have the capability to make payments using their mobile phone. While mobile payments provide a convenient tool for a consumer, mobile payments may also present security concerns. Sensitive information, such as a consumer's personal information, account information, etc. can be prone to interception. Additionally, if the mobile device is lost or stolen, such information can be used by an unauthorized user. Furthermore, as mobile payment applications evolve, there is a need not only to protect information sent from the mobile device, but also to protect information sent to the mobile device during transmission.

For example, when payments are made using a physical card with an embedded chip, the issuer associated with the payment card can update data in the chip during the course of a payment transaction. Chip data may be returned in the payment transaction response that contains authentication data or scripts for updating risk parameters and payment counters in the chip payment application. These issuer updates require the card to be inserted into a contact point-of-sale terminal. If a mobile device is used as a payment device, the mobile device cannot be inserted into a point-of-sale terminal to conduct a contact point-of-sale transaction and to receive issuer updates. Thus, there is an additional need for an issuer update solution for mobile devices that are used as payment devices.

Embodiments of the present technology address these and other problems.

BRIEF SUMMARY

Aspects of the embodiments of the present technology relate in general to improved systems and method for authentication. Such systems and methods improve the security of information transferred to and from a mobile device by authenticating the mobile device via a third party mobile gateway before information is transmitted.

One embodiment of the technology is directed at a method of authentication. The method includes sending a challenge message from a mobile gateway to a consumer device, the challenge message being sent in response to a communication request message, wherein the consumer device is configured for use as a payment device. The method further includes receiving a challenge response message from the consumer device at the mobile gateway in response to the challenge message. The method further includes sending the challenge response message from the mobile gateway to a key management center, wherein the key management center is configured to manage session keys for communication with the consumer device. The key management center verifies the challenge response message and allows a communication transaction between a first entity and the consumer device if the challenge response message is valid. The first entity can be, for example, an issuer associated with the consumer device.

Another embodiment of the technology is directed at a method of authentication. The method includes receiving a challenge response message at a key management center from a consumer device via a mobile gateway, the challenge response message being received in response to a challenge message sent by the mobile gateway to the consumer device, wherein the consumer device is configured for use as a payment device. The method also includes determining whether the challenge response message is valid and sending a secure channel response message from the key management center to the consumer device if the challenge response message is valid. The secure channel response message allows communication between the consumer device and a first entity.

Another embodiment of the technology is directed at a system. The system includes a mobile gateway and a key management center. The mobile gateway is configured to send a challenge message to a consumer device and receive a challenge response message from the consumer device in response to the challenge message, wherein the consumer device is configured for use as a payment device. The key management center is in communication with the mobile gateway and is configured to receive the challenge response message from the mobile gateway, determine whether the challenge response message is valid, and send a secure channel response message to the consumer device if the challenge response message is valid. The secure channel response message allows communication between the consumer device and a first entity.

Another embodiment of the technology is directed at a server computer. The server computer comprises a processor and a computer-readable storage medium having code embodied thereon, wherein the code is configured to cause the processor to perform a method. The method includes receiving a challenge response message from a consumer device via a mobile gateway, the challenge response message being received in response to a challenge message sent by the mobile gateway to the consumer device, wherein the consumer device is configured for use as a payment device. The method further includes determining whether the challenge response message is valid and sending a secure channel response message to the consumer device if the challenge response message is valid. The secure channel response message allows communication between the consumer device and a first entity.

These and other embodiments of the technology are described in further detail below.

BRIEF DESCRIPTION OF THE DRAWINGS

FIG. 10 depicts an exemplary block diagram of a computer apparatus.

DETAILED DESCRIPTION

Figure 1:
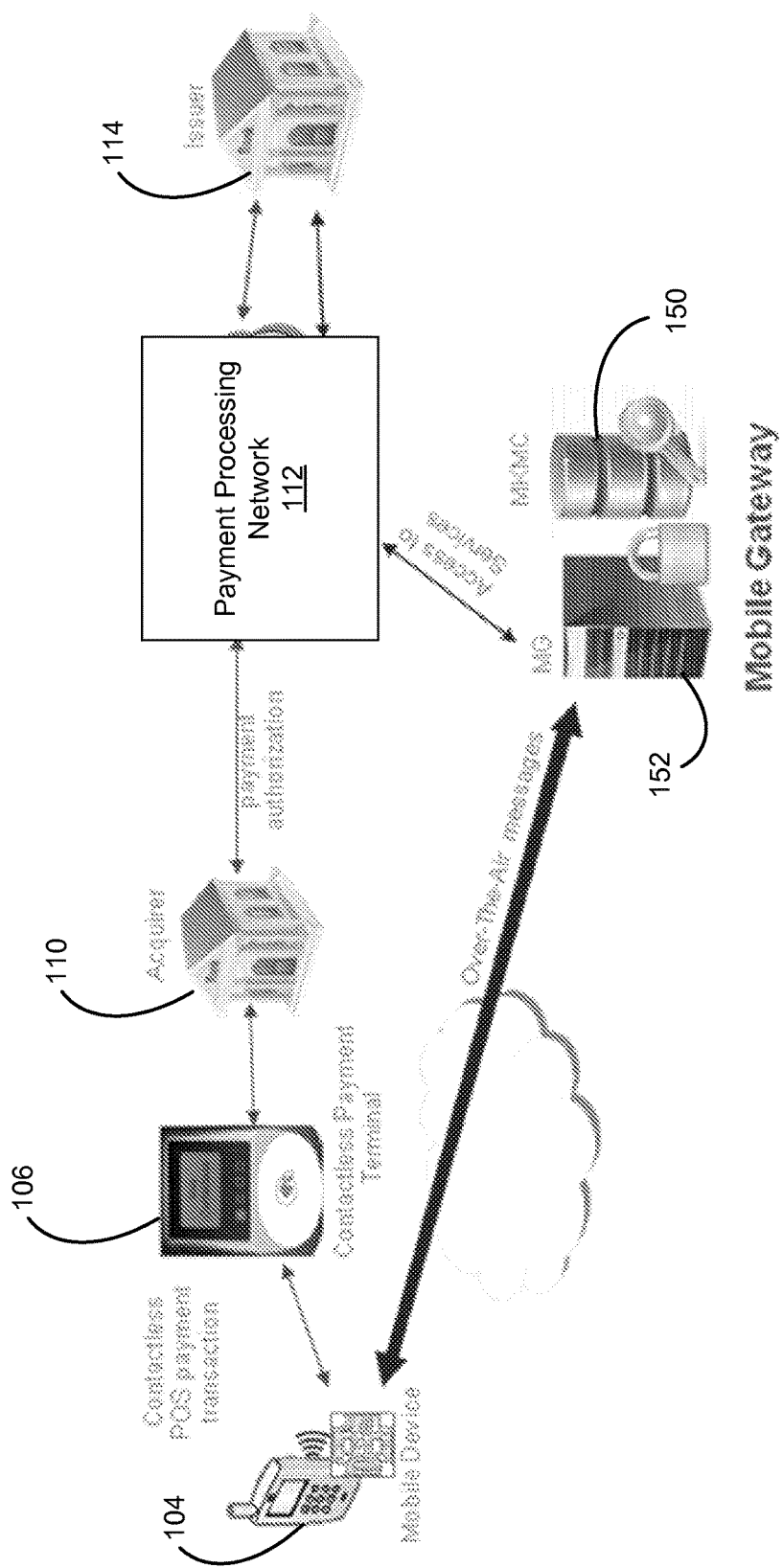
FIG. 1 illustrates a transaction flow diagram within a mobile gateway context.

Embodiments disclosed herein are directed to techniques for authenticating a consumer device to create a secure channel for communication between the consumer device and a first entity. The consumer device can be, for example, a mobile phone, which can be configured for use as a payment device that is associated with a payment processing network. The consumer device can be provisioned with payment-related applications and can be authenticated via a third-party mobile gateway using challenge-response authentication. As a specific example, when the consumer device requests communication with a particular entity (e.g. an issuer bank) via the application on the consumer device, the communication request is sent to the mobile gateway. In response, the mobile gateway sends a challenge message to the consumer device. The consumer returns a challenge response message to the mobile gateway via the application on the consumer device. The mobile gateway sends the challenge response to a key management center for validation. The key management center manages session keys for consumer device communications with different entities and may be associated with the payment processing network. The key management center determines whether the received challenge response message is valid. If the challenge response message is valid, a secure channel response message is returned to the mobile gateway and to the consumer device via the mobile gateway. The secure channel response message includes a session key which allows the consumer device to communicate with the first entity via a secure channel for any of a number of types of communications. For example, if the first entity is the issuer bank associated with the consumer device, the secure channel could be used to send issuer updates to the consumer device.

Embodiments of the present technology provide a number of advantages. The mobile gateway architecture provides increased security by authenticating the consumer device before allowing communication. Furthermore, establishing a secure channel with session keys provides increased protection for the information being transmitted via the channel. Additionally, because the mobile gateway architecture for creating the secure channel is centralized, the architecture provides flexibility for several entities that may wish to transmit information to and from the consumer device.

Prior to discussing the specific embodiments of the technology, a further description of some terms can be provided for a better understanding of embodiments of the technology.

An "issuer" can be any bank that issues and maintains a financial account for a consumer.

An "acquirer" can be any bank that provides and maintains a financial account for the merchant.

A "payment processing network" may include data processing subsystems, networks, and operations used to support and deliver authorization services, exception file services, and clearing and settlement services.

An "authorization request message" may be a message that includes information such as, e.g., a form factor of the consumer device or an issuer account identifier. The issuer account identifier may be a payment account identifier associated with a payment device (e.g. a consumer device). The authorization request message may request that an issuer of the payment device authorize a transaction. An authorization request message according to an embodiment of the technology may comply with ISO 8583, which is a standard for systems that exchange electronic transactions made by account holders using payment devices.

A "server computer" can be a powerful computer or a cluster of computers. For example, the server computer can be a large mainframe, a minicomputer cluster, or a group of servers functioning as a unit. In one example, the server computer may be a database server coupled to a Web server.

FIG. 1 depicts a transaction flow diagram within a mobile gateway context. For simplicity of discussion, only one of each component is shown. It is understood, however, that embodiments of the technology may include more than one of each component. Additionally, some embodiments of the technology may include fewer than all of the components shown in FIG. 1. Furthermore, the components in FIG. 1 may communicate via any suitable communication medium (including the Internet), using any suitable communication protocol. FIG. 1 depicts an example of the system in which a mobile gateway and a key management center may be implemented FIG. 1 shows a system that can be used in an embodiment of the technology. The system includes an access device 106, such as a contactless payment point-of-sale (POS) payment terminal, at a merchant and an acquirer 110 associated with the merchant. In a typical payment transaction, a consumer may purchase goods or services at the merchant via the access device 106 using a mobile consumer device 104. The acquirer 110 can communicate with an issuer 114 via a payment processing network 112.

The consumer may be an individual or an organization, such as a business that is capable of purchasing goods or services.

The consumer device 104 may be in any suitable form for contactless payment. For example, suitable consumer devices can be hand-held and compact so that they can fit into a consumer's wallet and/or pocket (e.g., pocket-sized). The consumer device 104 typically comprises a processor, a memory, input device, output devices, and near-field communication (NFC) devices, all of which are operatively coupled to the processor. Specific examples of consumer devices can include forms of portable communication devices, such as cellular or wireless phones, tablets, smartphones, personal digital assistances (PDAs), pagers, portable computers, and the like. In some embodiments, the consumer device 104 may be associated with multiple financial accounts, such as being associated with different payment accounts (e.g., credit, debit, or prepaid). Likewise, it is possible for the consumer to have multiple consumer devices 104 that are associated with the same underlying financial account.

The payment processing network 112 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network 112 may include a server computer and may use any suitable wired or wireless network, including the Internet.

The merchant can have, or may receive communications from, an access device 106 that can interact with the consumer device 104, such as a contactless POS device. The access device 106 according to embodiments of the technology can be in any suitable form for accessing data on a contactless consumer device. Examples of access devices can include POS devices, cellular phones, PDAs, personal computers (PCs), tablet PCs, handheld specialized readers, set-top boxes, electronic cash registers, automated teller machines (ATMs), virtual cash registers, kiosks, security systems, access systems, and the like. The access device 106 may include any suitable contact or contactless mode of operation (e.g., radio frequency (RF) antennas, NFC devices, etc.).

In a typical purchase transaction, the consumer purchases a good or service via the merchant's access device 106 using the consumer device 104. The consumer device 104 can interact with an access device 106 such as a contactless POS terminal at the merchant. For example, the consumer may take a wireless phone and may pass it near a contactless reader in a POS terminal.

An authorization request message is then forwarded from the access device 106 to the acquirer 110. After receiving the authorization request message at the acquirer 110, the authorization request message is then sent to the payment processing network 112. The payment processing network 112 then forwards the authorization request message to the issuer 114 of the consumer device 104.

After the issuer 114 receives the authorization request message, the issuer 114 sends an authorization response message back to the payment processing network 112 to indicate whether or not the current transaction is authorized (or not authorized). The payment processing network 112 then forwards the authorization response message back to the acquirer 110. The acquirer 110 then sends the response message back to the merchant.

After the merchant receives the authorization response message, the access device 106 at the merchant may then provide the authorization response message for the consumer. The response message may be displayed by the access device 106 or may be printed out on a receipt.

At the end of the day, a normal clearing and settlement process can be conducted by the payment processing network 112. A clearing process is a process of exchanging financial details between an acquirer and an issuer to facilitate posting to a consumer's account and reconciliation of the consumer's settlement position. Clearing and settlement can occur simultaneously. Typically, the merchant sends the clearance information to the acquirer at the end of the day, and the acquirer and issuer can subsequently facilitate the clearing and settlement process.

The mobile gateway 152 and the mobile key management center 150 can be used when over-the-air (OTA) messages need to be sent between the consumer device 104 and a first entity. The mobile gateway 152 provides the link to consumer devices over which services can be offered by entities such as issuers, payment processing networks, and other processors. The mobile gateway 152 can facilitate a challenge-response authentication of the consumer device 104. If the consumer device 152 is authenticated, the key management center 150 can provide session keys for a secure communication channel. The secure communication channel allows the consumer device 104 to securely access services provided by the payment processing network 112. More details about the functionality of the mobile gateway 152 and the key management center 150 are provided below.

Figure 2:
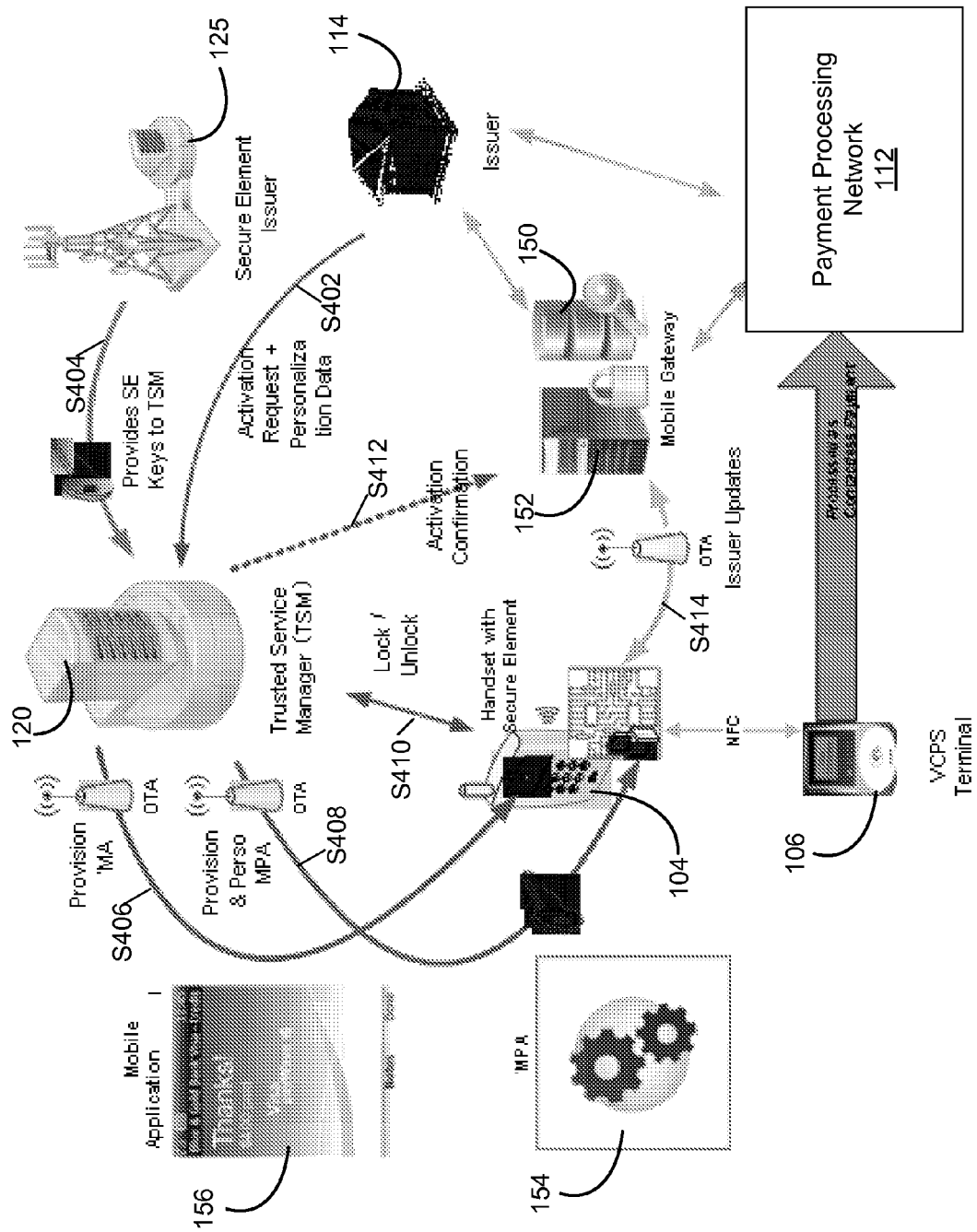
FIG. 2 illustrates a detailed flow diagram of the functionality of the mobile gateway and the key management center.

FIG. 2 illustrates a detailed flow diagram of the functionality of the mobile gateway 152 and the key management center 150. As discussed above, the mobile gateway 152 and the key management center 150 provide security for the services offered to the consumer on the consumer device 104. It should be noted that there may be differences in the architecture of FIG. 2 depending on a variety of factors. For example, there may be differences depending on whether the POS infrastructure is one which goes online to the issuer for transaction authorization or one which supports offline authorized transactions. Furthermore, it should be noted that while FIG. 2 shows OTA provisioning, other embodiments may utilize pre-provisioned consumer devices.

A mobile gateway 152 is a platform capable of providing secure services to a consumer device 106 via OTA messages over a secure channel. The mobile gateway 152 supports mobile contactless payments, such as those depicted in FIG. 1, and is utilized in a manner which enables the addition of future supporting services as the need arises.

In order to provide services to a consumer device 104 that supports contactless payments securely, the mobile gateway 152 supports two request-response message pairs. One request-response message pair is used to prepare the secure channel. This message pair allows the consumer device 104 and the mobile gateway 152 to exchange initial information. The second request-response message pair is used to establish the secure channel. This message pair allows the consumer device 104 and the mobile gateway 152 to mutually authenticate and allows the consumer device to receive session keys from the mobile gateway 152. Once the secure channel is established, the session keys are used to protect the confidentiality and integrity of the messages used by the supported services as appropriate to the needs of that service.

The transaction flow can be initiated via either a "pull" or a "push" situation. In a "pull" situation, the transaction is initiated by the consumer via interaction with the consumer device application or by the consumer device application itself due to a specific payment application status (e.g., when offline risk management parameters are low). In a "push" situation, the issuer initiates the transaction flow by sending a push message to the consumer device 106. However, the basic transaction flow is similar irrespective of how it is initiated. That is, a secure channel is first prepared and established, and then a specific service is requested utilizing the established secure channel.

The mobile payment application (MPA) 154 is a payment application that is installed in a secure element (SE) chip within a NFC-enabled consumer device 104. The MPA 154 provides the functionality to manage and maintain the consumer's payment information and support mobile contactless payments. During a payment transaction, the MPA 154 interacts with the access device 106 over the contactless interface to enable the mobile payment transaction. The entity issuing the MPA 154 to the consumer device 104 is typically a member of the payment processing network 112. In one embodiment, the entity issuing the MPA 154 is the issuer 114.

The MPA 154 also interfaces with the mobile application (MA) 156 on consumer device 104. The MA 156 is the consumer device application that provides a user interface for consumer interaction (e.g., to enter and view information). The MA 156 also communicates with the MPA 154 to retrieve and return information during the processing of any of a number of services offered to the consumer via the consumer device 104 (e.g., issuer update processing). Additionally, the MA 156 can communicate with the mobile gateway 152 to send and receive OTA messages.

The MPA 154 and the MA 156 may use data encryption standards such as, e.g., RSA with a key of at least 1024 bits, triple data encryption standard (DES), 128-bit advanced encryption standard (AES), an RC4 stream encryption algorithm using minimum 128-bit key length, etc. These encryption standards may be used to create the secure session.

The SE is used by the consumer device 104 to host and store data and applications that require a high degree of security. The SE is provided to the consumer device 104 by the SE issuer 125. The SE issuer 125 may not necessarily be a member of the payment processing network 112 or the same entity as the issuer 114 of the payment instrument (e.g. MPA 154 on the consumer device 106). For example, the SE issuer 125 may be a mobile network operator (MNO).

The MPA 154 can be installed within the SE to manage and maintain the security of payments. The entity issuing the MPA 154 may need a key and/or a token to install and personalize the MPA 154 on the SE. These keys may generally be managed on the issuer's behalf by a personalization bureau or Trusted Service Manager (TSM) 120. That is, these keys may be provided by the SE issuer 125 to the TSM 120 (S404).

The TSM 120 offers services to support mobile financial services. The basic functionalities that may be provided by the TSM 120 include the ability to manage SE keys for installing and configuring MPA 154 over the air. The TSM 120 may also be integrated with issuer systems for activating and personalizing the MPA 154 with consumers' payment information (S402). Upon receiving the activation request, the TSM 120 may provision the MA 156 and the MPA 154 over the air (S406 and S408). The TSM 120 may also lock or unlock the SE on the consumer device 104 (S410). Once activated, the TSM 120 may send an activation confirmation to the mobile gateway 152 (S412). Additionally, the TSM 120 may provide ongoing SE platform management and support.

Consumer devices 104 that support mobile contactless payments typically support contactless transactions using the EMV contactless communication protocol (EMV-CCP), which is based on ISO 14443, in order to interact with merchant access devices 106. This capability is typically met by implementing NFC. The NFC capability on the consumer device 104 might be enabled by an embedded NFC chip or by the addition of an external memory card or accessory that contains the NFC chip. Additionally, the consumer device 104 typically includes the SE either embedded in the handset or in the subscriber identity module (SIM). The SE can also be included in an add-on device such as a micro-Secure Digital (microSD) card.

As discussed above, the mobile gateway 152 allows consumer devices 104 to access services from the issuer 114 via the payment processing network 112, such as, e.g., issuer updates. The mobile gateway 152 provides a secure channel over which information can be transmitted securely through the consumer device 106 and over the mobile network and Internet. Mobile gateways 152 may be implemented by issuers, acquirers, third-party services providers, or TSMs 120.

The mobile gateway 152 uses the key management center 150 to set up a secure mutually authenticated channel with a MPA 154 instance in the consumer device 104. As part of this process, cryptographic keys may be used to enable the authentication of the MPA 154 to the key management center 150. Each MPA 154 instance is personalized with unique keys derived from an issuer-specific set of master keys. These master keys are shared between the issuer's personalization host and the key management center 150. These keys may be different from the keys used for authenticating chip payment transactions or issuer scripts and are used for the purpose of establishing the secure channel. The issuer's authorization host does not require any access to these cryptographic keys for establishing the secure channel.

Because the consumer device 104 can access services via the payment processing network 112 using the mobile gateway 152, the payment processing network 112 and the mobile gateway 152 are provisioned so that they may work together. In one embodiment, the payment processing network 112 may provide the mobile gateway 152 with a client certificate that is presented during the establishment of a mutually-authenticated secure sockets layer (SSL) channel. The mobile gateway 152 may install and store this certificate in a key storage location.

Furthermore, a username and a password may be created and provided to the mobile gateway 152 from the payment processing network 112. This username and password may be used during message authentication and can be passed as part of web service requests.

The payment processing network 112 may also provide the mobile gateway 152 with a client certificate that is presented in the web service request. The key management center 150 may use this client certificate to encrypt specific parts of the web service response for decryption by the mobile gateway 152.

Figure 3:
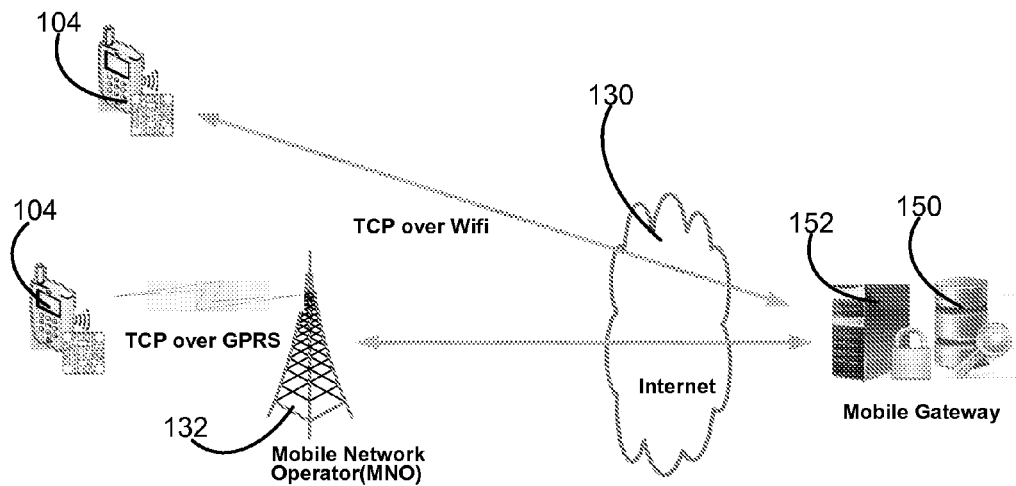
FIG. 3 illustrates an example of protocols used for communication.

FIG. 3 illustrates an example of protocols used for communication. Consumer device 104 has the capability to establish wireless communication with remote systems. The MA 156 and MPA 154 on the consumer device 104 may use this capability to communicate with the mobile gateway 152. The mobile gateway 152 may support the Transmission Control Protocol (TCP) so that the MA 156 can exchange binary messages with the mobile gateway 152. The TCP socket may provide a reliable connection over an underlying MNO or Wi-Fi network. The endpoint for a TCP socket is defined by an Internet Protocol (IP) address and port number. The message exchange is performed as a simple byte stream between the sender and recipient. The socket connection is established and then used as the bearer for the message exchange. The TCP connection may be provided over any data network accessible to the consumer device 104, such as General Packet Radio Service (GPRS) and third-generation (3G) networks for connectivity via the MNO 132 or via a Wi-Fi network for connectivity through an alternate service provider over the Internet 130, for example.

Figure 4:
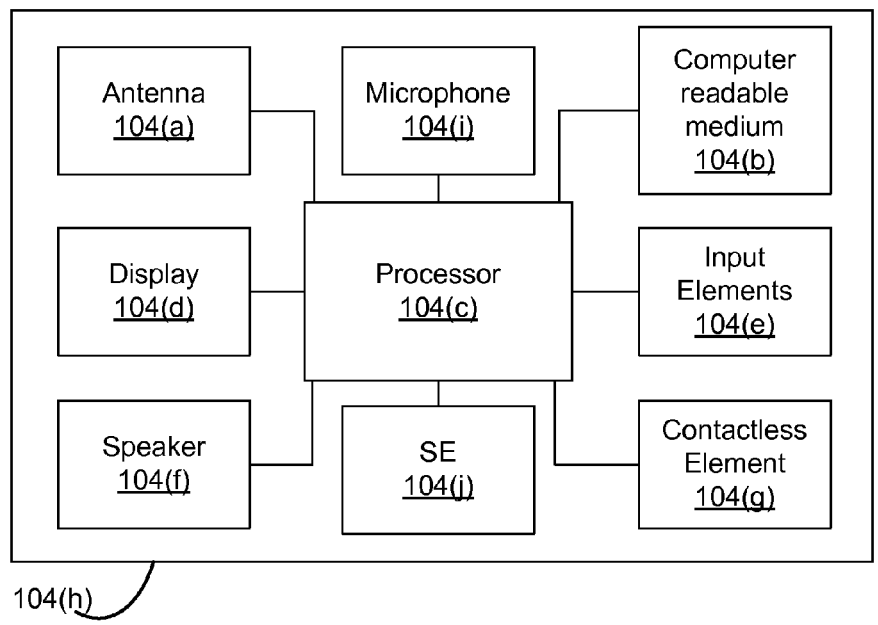
FIG. 4 depicts a block diagram of an exemplary consumer device.

FIG. 4 depicts a block diagram of an exemplary consumer device 104. The consumer device 104 may comprise a computer readable medium 104(*b*) and a body 104(*h*) as shown in FIG. 4. (FIG. 4 shows a number of components, and the consumer devices 104 according to embodiments of the invention may comprise any suitable combination or subset of such components.) The computer readable medium 104(*b*) may be present within the body 104(*h*), or may be detachable from it. The body 104(*h*) may be in the form a plastic substrate, housing, or other structure. The computer readable medium 104(*b*) may be a memory that stores data and may be in any suitable form including a magnetic stripe, a memory chip, uniquely derived keys (such as those described above), encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the consumer device 104. Furthermore, consumer device 104 may also include the SE 104(*j*), as described above.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The consumer device 104 may further include a contactless element 104(*g*), which is typically implemented in the form of a semiconductor chip (or other data storage element) with an associated wireless transfer (e.g., data transmission) element, such as an antenna. Contactless element 104(*g*) is associated with (e.g., embedded within) consumer device 104 and data or control instructions transmitted via a cellular network may be applied to contactless element 104(*g*) by means of a contactless element interface (not shown). The contactless element interface functions to permit the exchange of data and/or control instructions between the mobile device circuitry (and hence the cellular network) and an optional contactless element 104(*g*).

Contactless element 104(*g*) is capable of transferring and receiving data using a NFC capability (or NFC medium) typically in accordance with a standardized protocol or data transfer mechanism (e.g., ISO 14443/NFC). NFC capability is a short-range communications capability, such as RFID, Bluetooth™, infra-red, or other data transfer capability that can be used to exchange data between the consumer device 104 and an interrogation device. Thus, the consumer device 104 is capable of communicating and transferring data and/or control instructions via both cellular network and near field communications capability.

The consumer device 104 may also include a processor 104(*c*) (e.g., a microprocessor) for processing the functions of the consumer device 104 and a display 104(*d*) to allow a consumer to see phone numbers and other information and messages. The consumer device 104 may further include input elements 104(*e*) to allow a consumer to input information into the device, a speaker 104(*f*) to allow the consumer to hear voice communication, music, etc., and a microphone 104(*i*) to allow the consumer to transmit his or her voice through the consumer device 104. The consumer device 104 may also include an antenna 104(*a*) for wireless data transfer (e.g., data transmission).

Figure 5:
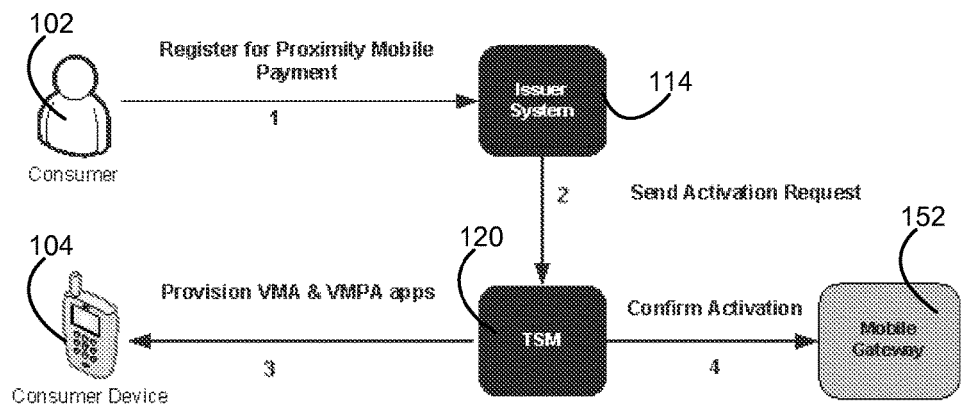
FIG. 5 illustrates an exemplary flow diagram for provisioning a consumer device.

FIG. 5 illustrates an exemplary flow diagram for provisioning a consumer device 104. The provisioning of the consumer device 104 may be initiated with or without a consumers' action based on the issuer's 114 business requirements. In step 1 of FIG. 5, the consumer 102 may register for the contactless mobile payment service. The issuer system 114 processes this request and takes appropriate action. In step 2, the issuer system 114 sends the activation request to TSM 120 with the appropriate personalization data. In step 3, the TSM 120 processes the issuer 114 requests, performs the provisioning of the MPA 154 and the MA 156, and personalizes them. In step 4, the TSM 120 confirms that activation is complete with all the required subscriber information with the mobile gateway 152. Updating information related to provisioning and deleting MPA 154 and MA 156 instances may happen in the same pattern as the provisioning process.

Mobile gateways 152 can be implemented using two different approaches. A distributed mobile gateway is a mobile gateway in which the key management center 150 is a separate entity from the mobile gateway 152. An integrated mobile gateway is a mobile gateway in which the key management center 150 is integrated with the mobile gateway 152.

Figure 6:
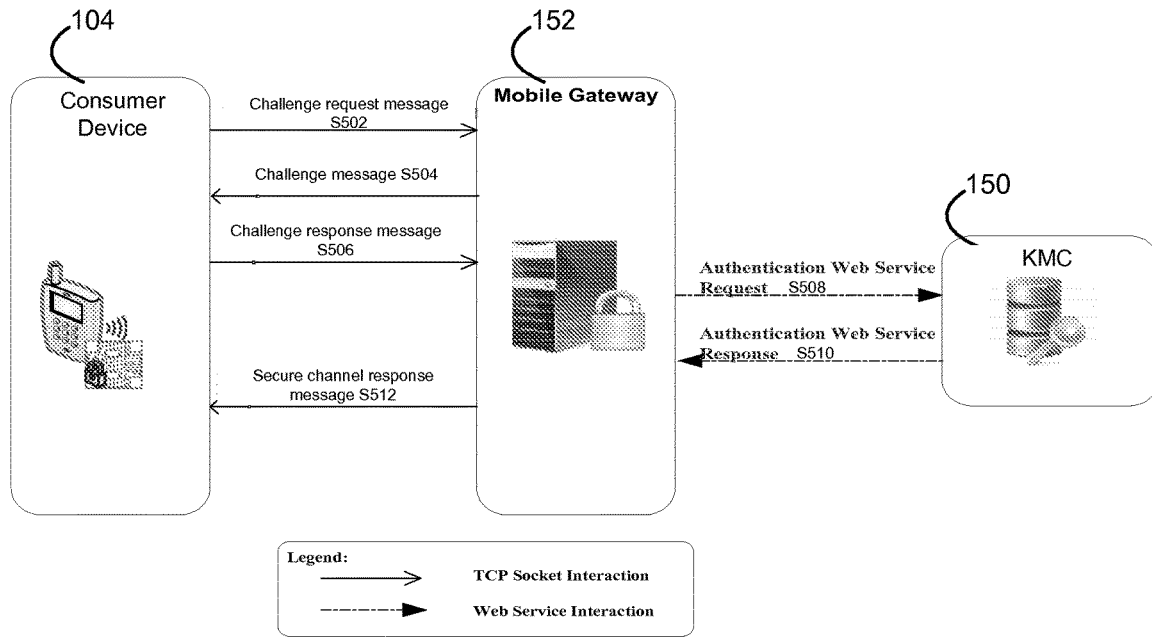
FIG. 6 depicts an exemplary flow diagram for authentication in a distributed system.

FIG. 6 depicts an example of a distributed mobile gateway. In a distributed approach, the key management center 150 is managed by the payment processing network 112. Thus, the key management center 150 in conjunction with the payment processing network 112 provides authentication services for both the mobile gateway 152 and the MPA 154, allowing the MPA 154 to access services from multiple mobile gateways without the issuer 114 having to share encryption keys for creating a secure channel with each mobile gateway provider. The encryption keys from the issuer 114 is securely stored at the key management center 150 operated by the payment processing network 112.

As shown in FIG. 6, authentication starts when the consumer device 104 sends a challenge request message to the mobile gateway 152 (S502). The challenge request message is a message that indicates that the consumer device 104 wishes to communicate with a first entity (e.g. an issuer). The challenge request message may include SE data for the consumer device 104. In response, the mobile gateway 152 sends a challenge message to the consumer device 104 (S504). The challenge message may include a question for the consumer device 104. The consumer device 104 may respond to the challenge message by returning a challenge response message, along with the challenge message, to the mobile gateway 152 (S506). The challenge response message may include an answer to the question posed by the challenge message.

The mobile gateway 152 sends an authentication web service request message to the key management center 150 over the Internet (S508). The authentication web service request is used to mutually authenticate the mobile gateway 152 with the key management center 150 via two-way SSL. The authentication web service request message may also include the challenge response message and the challenge message received from the consumer device 104. These credentials may be encrypted by the mobile gateway 152 before being sent to the key management center 150. Additionally, the authentication web service request message may include an identifier of the MPA 154 of the consumer device 104 and the client certificate for the mobile gateway 152. In one embodiment, a simple object access protocol (SOAP) envelope can be used for the authentication web service request message.

The key management center 150 will verify that the challenge response message is a valid response to the challenge message. If the consumer device credentials were encrypted by the mobile gateway 152, the key management center 150 will decrypt the credentials before verifying them. The key management center 150 will process the request by sending an authentication web service response message to the mobile gateway 152 upon verification (S510). In one embodiment, the key management center 150 may encrypt the authentication web service response message before sending it to the mobile gateway 152. The authentication web service response message will indicate whether or not the challenge response message is valid. In one embodiment, the authentication web service response message may include an encrypted data XML element with an encryption method of RSA, which is used to encrypt the session keys for the secure channel.

The mobile gateway 150 will process the response by sending a secure channel response message to the consumer device 104 which indicates whether a secure channel can be established (S512). If the authentication web service response message was encrypted by the key management center 150, the mobile gateway 152 may decrypt the message before processing the response. The secure channel can be established if the challenge response is valid. However, if the mobile gateway session is closed before the secure channel is set up, the mobile gateway 152 may not send a response message to the consumer device 104. If the mobile gateway session is closed due to an error after the secure channel is set up and the TCP connection is not already closed, the mobile gateway 152 may send a general error response to the consumer device 104 and close the mobile gateway session. The mobile gateway 152 may receive a SOAP message if the key management center 150 encounters errors. If the mobile gateway 152 receives this message, the mobile gateway 152 may log the error information for audit and future verification purposes.

Communication between the consumer device 104 and the mobile gateway 152 use TCP socket interaction. After authentication, the consumer device 104 and the mobile gateway 152 should communicate over a secure channel. Communication between the mobile gateway 152 and the consumer device 104 occurs via the Internet.

If the authentication is successful, the key management center 150 sends session keys to the mobile gateway 152 and to the consumer device 104 via the mobile gateway 152. The session keys are used to establish the secure channel using any encryption techniques, as discussed above. The consumer device 104 may then communicate with the first entity via the mobile gateway 152 over the secure channel. The different types of communication with the first entity will be described in more detail below.

Figure 7:
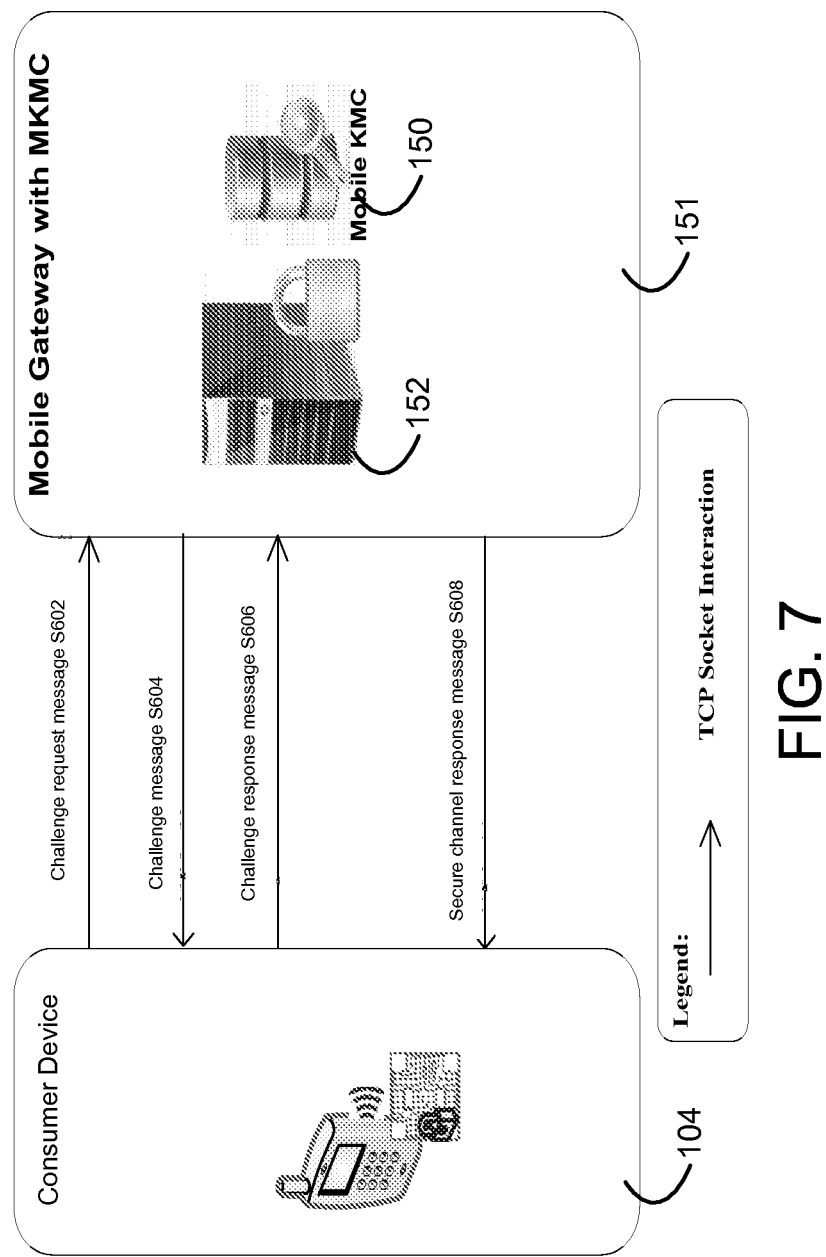
FIG. 7 depicts an exemplary flow diagram for authentication in an integrated system.

FIG. 7 depicts an example of an integrated mobile gateway 151. In an integrated mobile gateway 151, the key management center 150 is tightly integrated with the mobile gateway 152. The consumer device 104 and the integrated mobile gateway 151 communicate using a TCP connection. This implementation may require an issuer 114 to provide the session keys to the mobile gateway 151. Since an integrated mobile gateway 151 may provide additional encryption key handling and authentication services, the integrated mobile gateway 151 may also require the application of additional logical and physical security requirements.

As shown in FIG. 7 and similar to FIG. 6, a challenge request message is sent from the consumer device 104 to the integrated mobile gateway 151 (S602). In response, the integrated mobile gateway 151 returns a challenge message to the consumer device 104 (S104). The consumer device returns a challenge response message along with the challenge message to the integrated mobile gateway 151 (S606). The integrated mobile gateway 151 determines whether the challenge response message is valid. The integrated mobile gateway 151 then sends a secure channel response message to the consumer device 104 (S608). The secure channel response message indicates whether the challenge response message was valid.

For both the distributed mobile gateway of FIG. 6 and the integrated mobile gateway of FIG. 7, a secure channel is prepared and established to allow the consumer device 104 to securely communicate with a first entity. The mobile gateway 152 may prepare the secure channel by verifying the components of the challenge request message sent from the consumer device 104 to the mobile gateway 152, such as verifying whether the mobile application identifier associated with the MPA 154 received in the challenge request message is registered to be used with the mobile gateway 152, verifying the key management center identifier extracted from the mobile application identifier, etc. If the mobile gateway 152 encounters an error, the mobile gateway 152 may close the mobile gateway session.

If the challenge request message is valid, the mobile gateway 152 will create a challenge message and send the challenge message to the consumer device 104 (S504 of FIG. 6 and S604 of FIG. 7).

If the secure channel is successfully prepared, the secure channel may be established by the mobile gateway 152 and the key management center 150. The consumer device 102 sends the challenge response message to the mobile gateway 152. The mobile gateway 152 will validate the format of the challenge response message received from the consumer device 104 (S506 of FIG. 6 and S606 of FIG. 7). If the message format is invalid, the mobile gateway 152 may close the mobile gateway session.

If the message format is valid, the key management center 150 may validate the challenge response message from the consumer device 104. If the challenge response message is invalid, the mobile gateway 152 may close the mobile gateway sessions. If the challenge response message is valid, the key management center 150 may derive the session keys for the secure channel. The session keys will be sent to the mobile gateway 152 and the consumer device 104 via a secure channel response message. The session keys sent to the mobile gateway 152 may be encrypted differently than the session keys sent to the consumer device 104.

If the mobile gateway 152 experiences an error for which a message format cannot be derived or if the mobile gateway 152 decides to close the mobile gateway session (e.g., due to session expiry), the mobile gateway 152 may return a general error response.

Figure 8:
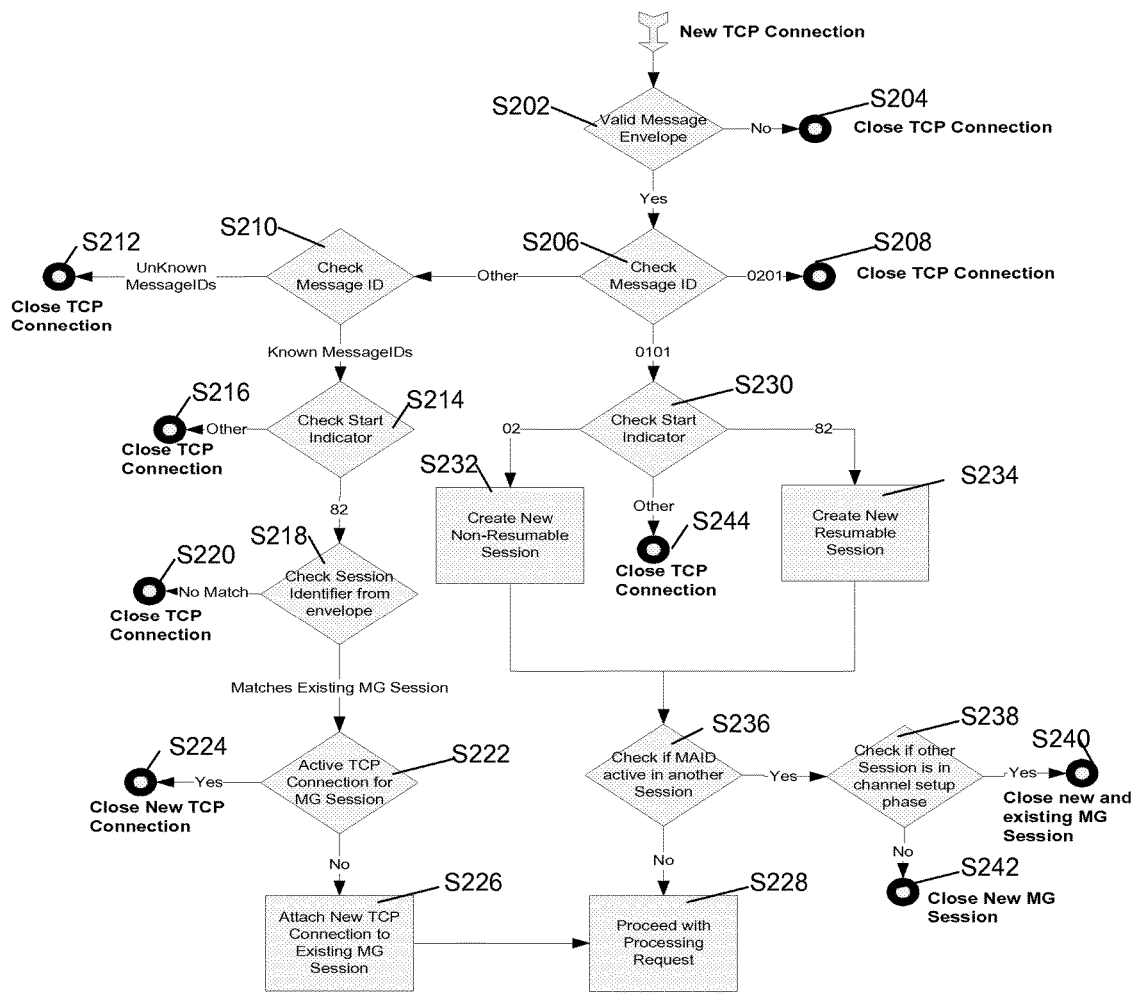
FIG. 8 illustrates an exemplary flow diagram for establishing a secure session using a new TCP connection.

FIG. 8 illustrates an exemplary flow diagram for establishing a secure session using a new TCP connection. As discussed above, when a consumer device 104 wishes to communicate with a first entity via the mobile gateway 152, the consumer device 104 must first establish a secure session. The mobile gateway 152 manages and maintains the session during the secure channel setup and also during the service invocation by the consumer device 104. The mobile gateway 152 can maintain a secure session using either a resumable session or a non-resumable session. A resumable session can be maintained across multiple TCP connections, while a non-resumable session is restricted to one TCP connection. Once a mobile gateway session has been established with the MPA 154 and MA 156, the mobile gateway 152 may close the mobile gateway session if messages are received out of order. For example, if a challenge response message is received before a challenge request message, the mobile gateway 152 may close the mobile gateway session. Additionally, the mobile gateway session may be closed if a challenge response message is not received within a period of time (e.g., 10 seconds) after the challenge message is sent to the consumer device 104.

Typically, the mobile gateway session is closed after the service response is sent via the mobile gateway 152. However, in one embodiment, the consumer device 104 may request that the mobile gateway session be kept alive for a subsequent service request. If the mobile gateway session is kept alive, it is possible that the TCP connection will drop before the consumer device can send the subsequent service request. If this occurs and the consumer device requested a resumable session, then the consumer device may open a new TCP socket connection and send the new service request stating the existing session ID. If the mobile gateway session was non-resumable, then the consumer device must repeat secure channel setup on a new TCP connection before it can send the service request.

In FIG. 8, the mobile gateway 152 determines whether the message format or envelope for a message received over a new TCP connection is valid (S202). If the message envelope is not valid, the mobile gateway 152 will close the TCP connection (S204). If the message envelope is valid, the mobile gateway 152 will check that the message ID is valid (S206). This message ID is checked to determine what type of message is being sent. The message ID may be invalid for a new TCP connection if it is a challenge response message sent from the consumer device 104 to the mobile gateway 152, since the challenge response message should be sent via an existing TCP connection that was initiated when a challenge request message was sent to the mobile gateway 152. This ensures that the consumer device 104 is the same device that requested the communication. If the message ID indicates that the message is a challenge response message, the message ID is not valid, and the mobile gateway 152 will close the TCP connection (S208).

If the message ID indicates that the message is a service request message (i.e., not a challenge request message or a challenge response message), the mobile gateway 152 will check the message ID again to determine that it is a known message ID (S210). If the message ID is unknown, the mobile gateway 152 will close the TCP connection (S212). If the message ID is known, the mobile gateway 152 will check the start indicator field in the message envelope (S214). If the start indicator field indicates a resumable session cannot be maintained, the mobile gateway 152 will close the TCP connection (S216). If the start indicator field indicates a resumable session can be maintained, the mobile gateway 152 will check the session identifier in the message envelope to determine whether the session identifier matches a session identifier for an existing mobile gateway session (S218). If there is no match, the mobile gateway will close the TCP connection (S220). If there is a match, the mobile gateway 152 will then check whether the existing mobile gateway session already has an active TCP connection (S222). If there is already an active TCP connection, then the mobile gateway 152 will close the new TCP connection (S224). If there is not an already active TCP connection for the existing mobile gateway session, then mobile gateway 152 will attach the new TCP connection to the matching and existing mobile gateway session (S226). At this point the mobile gateway 152 may proceed with processing the request (S228).

If in S206 the message ID indicates that the message is a challenge request message, the mobile gateway 152 will check the start indicator value in the message envelope (S230). If the start indicator value indicates a resumable session and the mobile gateway 152 maintains a non-resumable session, or if the start indicator value indicates a non-resumable session and the mobile gateway 152 maintains a resumable session, the mobile gateway 152 will close the TCP connection (S244). If the start indicator value indicates a non-resumable session and the mobile gateway may maintain a non-resumable session, a non-resumable session will be created (S232). If the start indicator value indicates a resumable session and the mobile gateway may maintain a resumable session, a resumable session will be created (S234). Once either a non-resumable or a resumable session is successfully created, the mobile gateway 152 will check if the mobile application (i.e. MPA 154) identifier is active in another session (S236). If the mobile application identifier is active in another session, the mobile gateway 152 will check to see if the other session is in a channel setup phase (S238). If so, the mobile gateway 152 will close the new and existing mobile gateway sessions (S240). If the other session is not in a channel setup phase, the mobile gateway 152 will close the new mobile gateway session (S242). If in S236 the mobile application identifier is not active in another session, the mobile gateway 152 will proceed with processing the request (S228).

Figure 9:
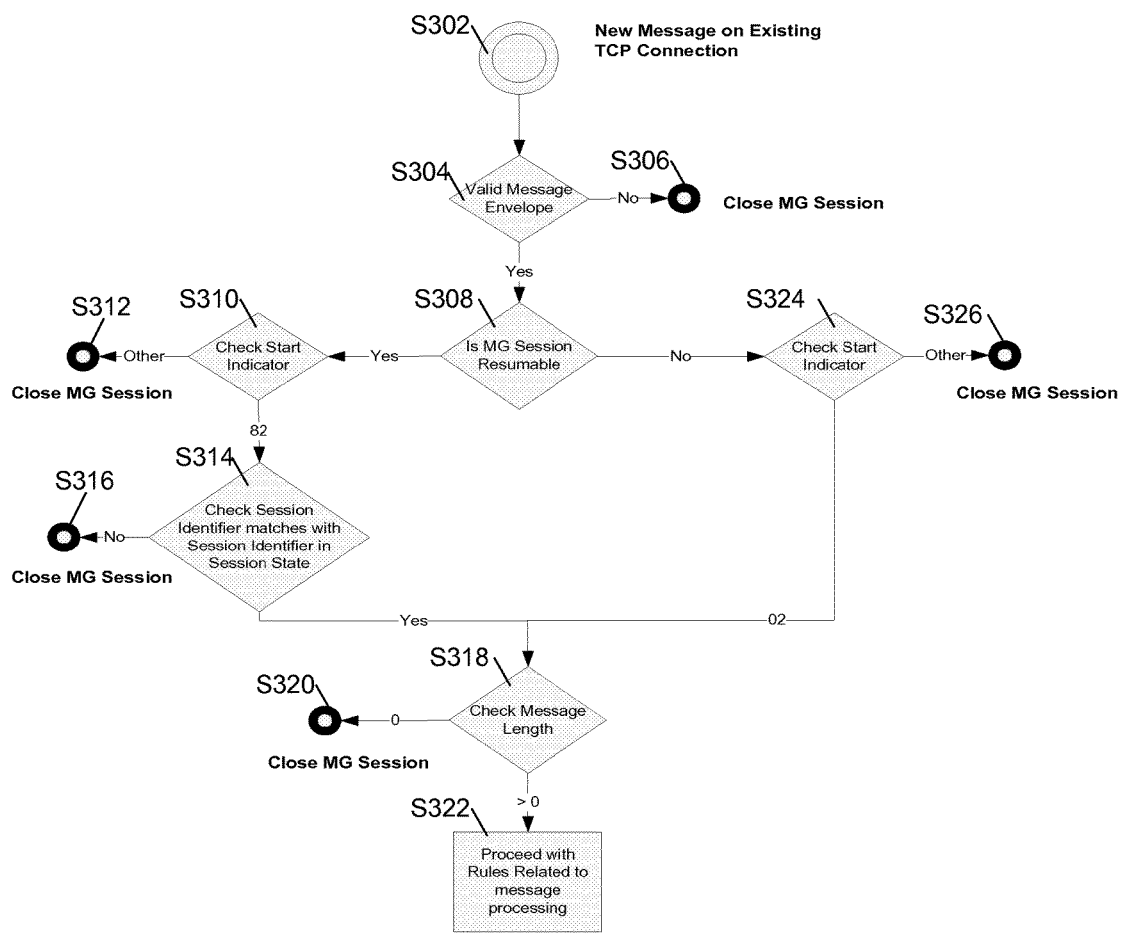
FIG. 9 illustrates an exemplary flow diagram for establishing a secure session using an existing TCP connection.

FIG. 9 represents session management processing that occurs when subsequent messages are received on the same TCP socket connection. When a new message on an existing TCP connection is received by the mobile gateway 152 (S302), the mobile gateway 152 will determine whether the message format is valid (S304). If the message format is invalid, the mobile gateway 152 will close the mobile gateway session (S306). If the message format is valid, the mobile gateway 152 will determine whether the mobile gateway session is resumable (S308). If the mobile gateway session is resumable, the mobile gateway 152 will check the start indicator in the message to see if it indicates a resumable session (S310). If the start indicator does not indicate a resumable session, the mobile gateway 152 will close the mobile gateway session (S312). If the start indicator indicates a resumable session, the mobile gateway 152 will check if the session identifier in the message matches with the session identifier in the session state (S314). If there is not a match, the mobile gateway 152 will close the mobile gateway session (S316). If there is a match, the mobile gateway 152 will check the message length (S318). If the message length is zero, the mobile gateway 152 will close the mobile gateway session (S320). If the message length is greater than zero, the mobile gateway 152 will proceed with the rules related to message processing (S322).

If the mobile gateway session is non-resumable, the mobile gateway 152 will check the start indicator in the message to see if it indicates a non-resumable session (S324). If the start indicator does not indicate a non-resumable session, the mobile gateway 152 will close the mobile gateway session (S326). If the start indicator value indicates a non-resumable session, the mobile gateway 152 check the message length (S318). If the message length is zero, the mobile gateway 152 will close the mobile gateway session (S320). If the message length is greater than zero, the mobile gateway 152 will proceed with the rules related to message processing (S322).

Once the secure channel is successfully prepared and established, communication can occur between the consumer device 104 and the first entity. The first entity can be any entity requiring a secure channel for OTA communication with the consumer device 104. After the successful establishment of a secure channel, the consumer device 104 may construct a message that contains SE chip data to the first entity and send the message to the mobile gateway 152.

The mobile gateway 152 may then construct and forward the appropriate request to the first entity. The mobile gateway 152 may need to construct the request message in a manner that the first entity can understand. When the mobile gateway 152 receives a response from the first entity, the mobile gateway 152 may translate the response from the first entity into an OTA message to be returned to the consumer device 104.

In one embodiment, the first entity is an issuer 114. The issuer 114 may wish to control and/or update the MPA 154 on the consumer device 104. For example, the issuer 114 may wish to update the MPA 154 with additional information associated with the payment account of the consumer. For example, the consumer device 104 may request an update for the MPA 154 when offline risk counters and indicators in the MA 156 have reached certain thresholds, such that the MA 156 triggers a mobile update request, when an issuer sends a 'talk-to-me' push notification, etc. For issuer updates, the mobile gateway 152 is used to establish the secure connection between the MPA 154 and the associated issuer 114 in order to enable the delivery of the updates. The updates can further include, but are not limited to, card parameter updates, blocking or unblocking the MPA 154, disabling payment ability, unblocking or changing the passcode for the MPA 154, setting the passcode to a default passcode, etc.

In addition to the capability to control and/or update the MPA 154, the issuer may provide additional features for value-added services. The issuer 114 may allow the consumer to inquire about one or more of their balances, and the issuer 114 may provide the one or more balances to the consumer device 104 over the secure channel. The issuer 114 may provide a message indicating top-up or add additional funds to a prepaid payment account associated with the consumer device 104 over the secure channel using a funding account linked to the prepaid payment account. The issuer 114 may also process a request for and provide a dynamic card verification value 2 (CVV2) for use in card-not-present (CNP) transactions.

The various participants and elements, such as, e.g., the mobile gateway or the key management center, described herein with reference to the figures may operate one or more computer apparatuses to facilitate the functions described herein. Any of the elements in the figures, including any servers or databases, may use any suitable number of subsystems to facilitate the functions described herein.

Examples of such subsystems or components are shown in FIG. 10. The subsystems shown in FIG. 10 are interconnected via a system bus 475. Additional subsystems such as a printer 474, keyboard 478, fixed disk 479 (or other memory comprising computer readable media), monitor 476, which is coupled to display adapter 482, and others are shown. Peripherals and input/output (I/O) devices, which couple to I/O controller 471 (which can be a processor or other suitable controller), can be connected to the computer system by any number of means known in the art, such as serial port 477. For example, serial port 477 or external interface 481 can be used to connect the computer apparatus to a wide area network such as the Internet, a mouse input device, or a scanner. The interconnection via system bus allows the central processor 473 to communicate with each subsystem and to control the execution of instructions from system memory 472 or the fixed disk 479, as well as the exchange of information between subsystems. The system memory 472 and/or the fixed disk 479 may embody a computer readable medium.

Embodiments of the technology are not limited to the above-described embodiments. For example, although separate functional blocks are shown for an issuer, payment processing network, and acquirer, some entities perform all of these functions and may be included in embodiments of the technology.

Further, additional embodiments of the invention may be directed to methods and systems involving merchants, and their access devices, as well as issuers. For example, other embodiments may include the following additional embodiments.

One embodiment may be directed toward communications between the consumer device and the issuer, wherein the consumer device may request a balance inquiry and the issuer may return an account balance in response over the secure channel.

One embodiment may be directed toward the mobile gateway closing the secure session if any of a number of errors occurs. For example, the mobile gateway secure session may be closed if a message format is improper, if the messages received at the mobile gateway are out of order, if the start indicator is invalid, etc.

Specific details regarding some of the above-described aspects are provided above. The specific details of the specific aspects may be combined in any suitable manner without departing from the spirit and scope of embodiments of the technology. For example, back end processing, data analysis, data collection, and other transactions may all be combined in some embodiments of the technology. However, other embodiments of the technology may be directed to specific embodiments relating to each individual aspect, or specific combinations of these individual aspects.

It should be understood that the present technology as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present technology using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

One or more features from any embodiment may be combined with one or more features of any other embodiment without departing from the scope of the technology.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of authentication, comprising:

receiving, by a consumer device, a challenge message from a mobile gateway, the challenge message being sent in response to a communication request message, wherein the consumer device is configured for use as a payment device;

sending, by the consumer device, a challenge response message to the mobile gateway in response to the challenge message, the mobile gateway verifying the challenge response message using a key management center, wherein the key management center is configured to manage session keys for communication with the consumer device, and wherein the key management center allows a communication transaction between a first entity and the consumer device if the challenge response message is valid; and receiving, by the consumer device, a secure channel response message including a session key from the mobile gateway, the session key allowing communication between the first entity and the consumer device, wherein the session key is derived from a master key associated with the first entity and stored at the key management center.

2. The method of claim 1, wherein the first entity is not contacted until the challenge response message is verified.

3. The method of claim 1, wherein the mobile gateway provides a secure channel through which information can be transmitted between the consumer device and the first entity.

4. The method of claim 1, wherein the first entity is an issuer associated with the consumer device and wherein the communication transaction between the first entity and the consumer device includes issuer updates for the consumer device.

5. The method of claim 4, wherein the issuer updates include updating parameters for the consumer device, blocking a payment application on the consumer device, unblocking the payment application, disabling payment, unblocking a passcode on the consumer device, changing the passcode on the consumer device, or setting the passcode to a default passcode.

6. The method of claim 1, wherein the consumer device is associated with a prepaid payment account and wherein the communication transaction between the first entity and the consumer device includes adding funds to the prepaid payment account using a funding account linked to the prepaid payment account.

7. A system, comprising:

a consumer device configured for use as a payment device, the consumer device including a memory and a processor and being further configured to:
receive a challenge message from a mobile gateway;
send a challenge response message to the mobile gateway in response to the challenge message; and
receive a secure channel response message including a session key from the mobile gateway, the session key allowing communication between a first entity and the consumer device;

the mobile gateway, the mobile gateway being configured to:
send the challenge message to the consumer device;
receive the challenge response message from the consumer device;
verify the challenge response message using a key management center; and
send the secure channel response message including the session key to the consumer device; and the key management center communicatively coupled with the mobile gateway, the key management center being configured to:
verify that the challenge response message is valid; and
generate the session key, the session key allowing communication between the consumer device and a first entity, wherein the session key is derived from a master key associated with the first entity and stored at the key management center.

8. The system of claim 7, wherein the first entity is not contacted until the challenge response message is verified.

9. The system of claim 7, wherein the mobile gateway provides a secure channel through which information can be transmitted between the consumer device and the first entity.

10. The system of claim 7, wherein the first entity is an issuer associated with the consumer device and wherein a communication transaction between the first entity and the consumer device includes issuer updates for the consumer device.

11. The system of claim 10, wherein the issuer updates include updating parameters for the consumer device, blocking a payment application on the consumer device, unblocking the payment application, disabling payment, unblocking a passcode on the consumer device, changing the passcode on the consumer device, or setting the passcode to a default passcode.

12. A consumer device, comprising:

a processor; and a non-transitory computer-readable storage medium having code embodied thereon, the code being configured to cause the processor to perform a method comprising:
receiving a challenge message from a mobile gateway, the challenge message being sent in response to a communication request message, wherein a consumer device is configured for use as a payment device;
sending a challenge response message to the mobile gateway in response to the challenge message, the mobile gateway verifying the challenge response message using a key management center, wherein the key management center is configured to manage session keys for communication with the consumer device, and wherein the key management center allows a communication transaction between a first entity and the consumer device if the challenge response message is valid; and
receiving a secure channel response message including a session key from the mobile gateway, the session key allowing communication between the first entity and the consumer device, wherein the session key is derived from a master key associated with the first entity and stored at the key management center.

13. The consumer device of claim 12, wherein the first entity is not contacted until the challenge response message is verified.

14. The consumer device of claim 12, wherein the mobile gateway provides a secure channel through which information can be transmitted between a consumer device and the first entity.

15. The consumer device of claim 12, wherein the first entity is an issuer associated with the consumer device and wherein the communication transaction between the first entity and the consumer device includes issuer updates for the consumer device.

16. The consumer device of claim 12, wherein the consumer device is associated with a prepaid payment account and wherein the communication transaction between the first entity and the consumer device includes adding funds to the prepaid payment account using a funding account linked to the prepaid payment account.

17. The consumer device of claim 15, wherein the issuer updates include updating parameters for the consumer device, blocking a payment application on the consumer device, unblocking the payment application, disabling payment, unblocking a passcode on the consumer device, changing the passcode on the consumer device, or setting the passcode to a default passcode.

* * * * *